(12) United States Patent
Diethorn

(10) Patent No.: US 8,355,335 B2
(45) Date of Patent: Jan. 15, 2013

(54) MANAGING THE AUDIO-SIGNAL LOSS PLAN OF A TELECOMMUNICATIONS NETWORK

(75) Inventor: Eric John Diethorn, Long Valley, NJ (US)

(73) Assignee: Avaya Inc., Basking Ridge, NJ (US)

( * ) Notice: Subject to any disclaimer, the term of this patent is extended or adjusted under 35 U.S.C. 154(b) by 760 days.

(21) Appl. No.: 12/207,209

(22) Filed: Sep. 9, 2008

(65) Prior Publication Data

US 2010/0062719 A1    Mar. 11, 2010

(51) Int. Cl.
     *H04J 1/16*      (2006.01)
(52) U.S. Cl. ......... 370/252; 370/352; 370/353; 370/401
(58) Field of Classification Search .................. 370/250, 370/252, 355, 356
See application file for complete search history.

(56) References Cited

U.S. PATENT DOCUMENTS

| | | | | |
|---|---|---|---|---|
| 5,485,515 | A * | 1/1996 | Allen et al. ................... | 379/391 |
| 7,103,003 | B2 * | 9/2006 | Brueckheimer et al. ...... | 370/252 |
| 7,167,451 | B1 * | 1/2007 | Oran ............................. | 370/252 |
| 7,289,626 | B2 * | 10/2007 | Carter et al. ............. | 379/387.02 |
| 7,430,179 | B2 * | 9/2008 | Towns-von Stauber et al. .............................. | 370/252 |
| 7,512,149 | B2 * | 3/2009 | Basso et al. ................... | 370/465 |
| 7,535,892 | B2 * | 5/2009 | Chun ............................. | 370/352 |
| 7,543,063 | B1 * | 6/2009 | Grove et al. .................. | 709/227 |
| 7,609,637 | B2 * | 10/2009 | Doshi et al. ................... | 370/235 |
| 7,995,557 | B2 * | 8/2011 | Li et al. .......................... | 370/352 |
| 2002/0015387 | A1 * | 2/2002 | Houh ............................. | 370/250 |
| 2006/0215683 | A1 * | 9/2006 | Sukkar et al. ................. | 370/437 |
| 2007/0097876 | A1 * | 5/2007 | Maes ............................. | 370/252 |

* cited by examiner

*Primary Examiner* — Dang Ton
*Assistant Examiner* — Brian O Connor

(57) ABSTRACT

A method is disclosed that enables the monitoring, evaluation, and adjustment of a telecommunications network's audio-signal loss plan. The method can be implemented at a data-collection server, in which the server accumulates voice-quality measurement statistics from various nodes in the network. Such nodes include telecommunications endpoints, media gateways, private-branch exchanges, teleconference bridges, and so forth. The different types of statistics that can be acquired include voice activity detection, average speech level, average noise level, and so forth. The server accumulates the statistical data from the various nodes for multiple calls and over an extended period of time. The server is also able to compare the statistics against a theoretical model that is a function of the loss plan, at least in part. For example, the comparisons that the data-collection server performs can be used to determine why certain calls have been reported as having unsatisfactory quality.

16 Claims, 4 Drawing Sheets

MANAGING THE AUDIO-SIGNAL LOSS PLAN OF A TELECOMMUNICATIONS NETWORK

FIELD OF THE INVENTION

The present invention relates to telecommunications in general, and, more particularly, to managing the audio-signal loss plan of a telecommunications network.

BACKGROUND OF THE INVENTION

Traditionally, Public Switched Telephone Network ("PSTN") telephony systems provided service by utilizing relatively homogeneous, centralized switching infrastructures. These infrastructures were homogeneous in the sense that a single service provider, such as the former Bell System in the United States, utilized a relatively limited, uniform group of telecommunications equipment in a voice-only network that provided "plain, old telephony service" (POTS). These traditional infrastructures were uniform in structure and composition, mainly because they were designed from the top on down. In part because they were centralized, these infrastructures generally had knowledge as to the signal transmission characteristics for every piece of equipment involved in each handled call. Based on this knowledge, the traditional PSTN could make adjustments for end-to-end audio-signal loss, thereby optimizing performance with respect to acoustical audio signal level, audio distortion, and echo. Furthermore, guidance as to the audio-signal loss across various telecommunications device types could be found in various standards and technical guidelines.

For example, in order to reduce the echo signals that were unavoidably present in each transmit path, the echo signals would be carried to the receive path of the line side equipment serving the far-end party and reduced there, based upon an audio-signal loss plan conventionally used by each service provider. The loss plan provided that a predetermined fixed amount of loss would be present in a receive path. The particular amount of fixed loss (e.g., 0 db, 3 dB, 6 dB, etc.) depended upon the type of call: intra-office, intra-exchange (local), intra-LATA (toll), or inter-LATA (toll).

In contrast, modern hybrid telecommunications systems typically must offer interconnectivity between disparate telecommunications networks such as datagram-based networks, the Internet being an example of this, and traditional circuit-switched networks. Additionally, a given network often must handle different types of media concurrently. For example, Voice over Internet Protocol ("VoIP") systems provide voice telephony over the same networks that handle email, video, and other Internet traffic. Moreover, whereas before there were one or two service providers—that is, local providers and possibly long-distance providers—involved in a particular telephony call, now there can be several service providers involved in handling the media data packets of a given call or session. Finally, each provider's telecommunications network might comprise equipment from many more vendors than before.

A telecommunications system that comprises a business enterprise's network poses additional challenges in optimizing the call quality that is experienced by its users. In such a network, there are telecommunications endpoint devices interconnected with private-branch exchanges and teleconference bridges. To complicate the call-quality management, the audio signals passing through these components often continue on through media gateways to different, globally-reaching, service provider networks. There are techniques for managing the audio signals as they pass through the different components both within and outside of the enterprise network, such as automatic gain control (AGC). These techniques, however, often produce unwanted effects, such as "pumping up" background noise, and often mishandle certain types of signals, such as music-on-hold.

Consequently, the audio-signal loss plan in today's telecommunications networks is significantly more complex to manage than ever before. There are more situations in which the signal amplitude is too low or the noise is too high, or both. Therefore, it would be advantageous to provide a system and method for dynamic end-to-end loss compensation, particularly in an enterprise telecommunications network, with an ability to accommodate the characteristics of the various types of telecommunications devices present.

SUMMARY OF THE INVENTION

The present invention enables the monitoring, evaluation, and adjustment of a telecommunications network's audio-signal loss plan, such as the loss plan of an enterprise network. In accordance with the illustrative embodiment of the present invention, a data-collection server accumulates voice-quality measurement statistics from various nodes in the network. Such nodes include telecommunications endpoints, media gateways, private-branch exchanges, teleconference bridges, and so forth. The different types of statistics that can be acquired include voice activity detection, average speech level, average noise level, and so forth. These statistics can be acquired for multiple paths that pass through each reporting node, such as the receive path into an endpoint from the network and the transmit path of an endpoint user's speech signals from the endpoint into the network. The data-collection server accumulates the statistical data from the various nodes for multiple calls and over an extended period of time.

As the voice-quality measurement (VQM) statistics are accumulated, the server is also able to compare the statistics against a theoretical model that is a function of the loss plan, at least in part. For example, the comparisons that the data-collection server performs can be used to determine why certain calls have been reported (e.g., by customers, etc.) as having unsatisfactory quality. The important distinction between the data-collection server and some systems in the prior art is that whereas various prior-art techniques historically have been designed with traditional, homogeneous infrastructures in mind, the server advantageously makes use of the relatively new VQM-reporting capabilities that are becoming available in various types of telecommunications equipment—in particular, enterprise-oriented equipment such as packet-based endpoints, private-branch exchanges, teleconference bridges, and media gateways. By accumulating a large set of VQM statistics, which is made possible by enlisting a large number of reporting nodes possibly over an extended period of time, the data-collection server can pinpoint different types of loss-plan issues at different points in the monitored network.

For pedagogical purposes, three operating scenarios that involve the illustrative embodiment are disclosed herein. In the first operating scenario, the server accumulates voice-quality measurements from a predetermined endpoint and uses those accumulated statistics to adjust a parameter related to the audio loss plan and at a selected media gateway. In the second operating scenario, the server accumulates a first plurality and second plurality of voice-quality measurements from a first endpoint and second endpoint, respectively, where the two endpoints are collocated within the same acoustic environment (e.g., in a call center, etc.). In the second scenario, the server uses the accumulated statistics for the purpose of analyzing issues such as how to assign calls at a call center, whether to add acoustic suppression (e.g., ceiling tiles, etc.) to the acoustic environment, and so forth. And in the third operating scenario, the server accumulates a first plurality and second plurality of voice-quality measurements from a first set of endpoints and second set of endpoints, respectively. In the third scenario, the server uses those accumulated statistics for the purpose of analyzing issues such why the audio signals that are being received from one service provider's network might be consistently at a different signal level than those being received from another service provider's network. As those who are skilled in the art will appreciate, the data-collection server of the illustrative embodiment can be used for additional purposes than those explicitly disclosed herein.

A method is disclosed for managing an audio-signal loss plan of an enterprise network in a telecommunications system in accordance with the illustrative embodiment, the enterprise network serving telecommunications endpoints connected to the enterprise network, in which the method comprises: accumulating, at a data-processing system, a plurality of voice-quality measurements from a predetermined endpoint that is served by the enterprise network, the telecommunications endpoint being adapted to transmit and receive voice signals that pass through the enterprise network and a telecommunications gateway via a transmit path and a receive path, respectively; comparing the plurality of voice-quality measurements to a theoretical target that is a function of the audio-signal loss plan, resulting in a comparison result; and transmitting a signal from the data-processing system to a network node in the telecommunications system, in order to adjust a gain factor of at least one of the transmit path and the receive path, the amount of the adjustment being based on the comparison result.

DETAILED DESCRIPTION

Figure 1:
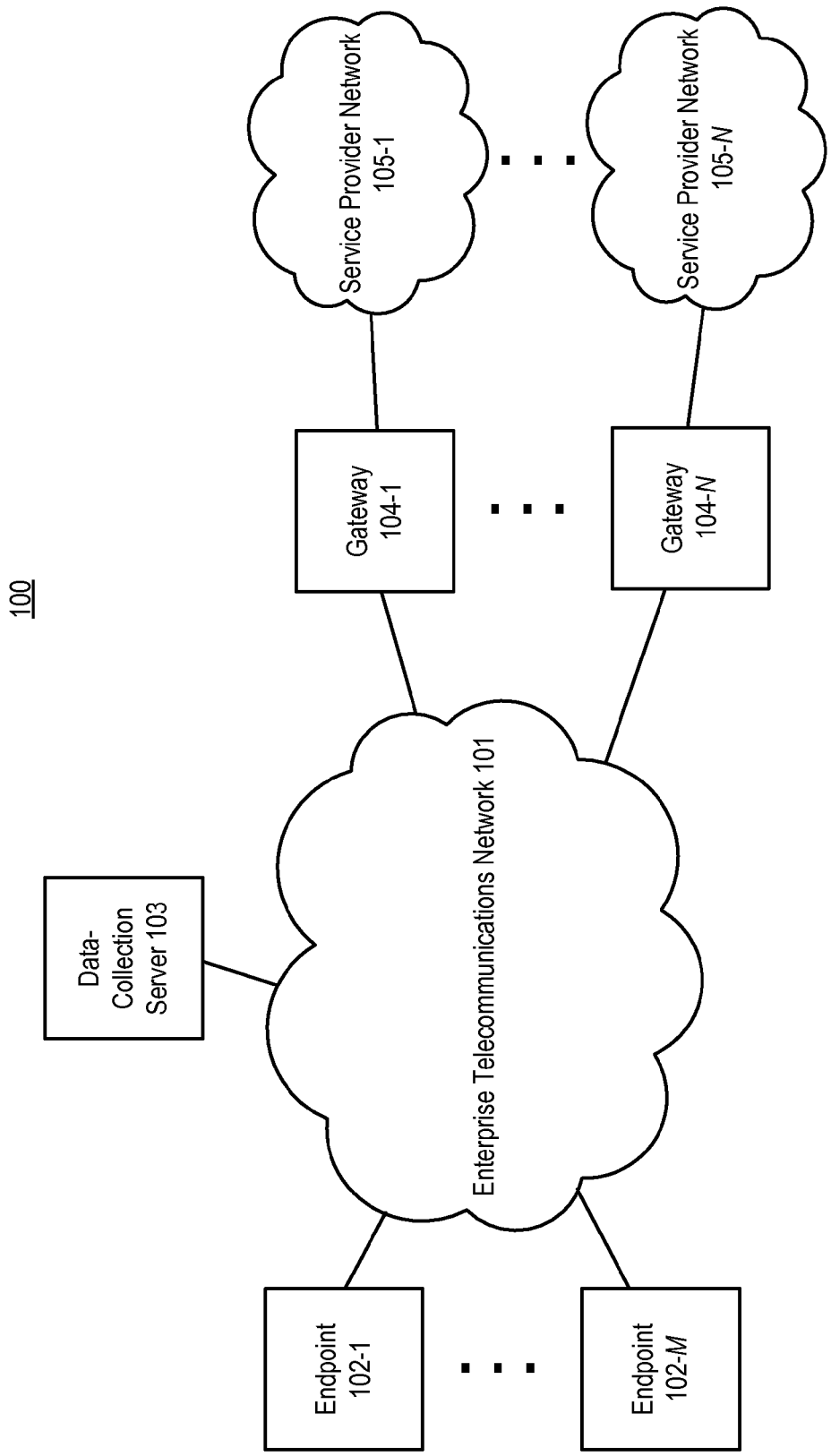
FIG. 1 depicts a schematic diagram of telecommunications system 100 in accordance with the illustrative embodiment of the present invention.

FIG. 1 depicts a schematic diagram of telecommunications system 100 in accordance with the illustrative embodiment of the present invention. System 100 comprises enterprise telecommunications network 101; telecommunications endpoints 102-1 through 102-M, wherein M is a positive integer; data-collection server 103; gateways 104-1 through 104-N, wherein N is a positive integer; and service provider network 105-1 through 105-N. The depicted elements in system 100 are interconnected as shown.

Enterprise telecommunications network 101 enables the transport and control of communications signals among endpoints such as endpoints 102-1 through 102-M. The communications signals convey media signals, such as audio, video, and so forth. To this end, network 101 comprises one or more interconnected data-processing systems such as private-branch exchanges, switches, servers, routers, gateways, and teleconference bridges, as are well-known in the art.

In accordance with the illustrative embodiment, network 101 comprises an Internet Protocol-based (IP-based) network, as is known in art, for the purpose of transmitting bitstreams of encoded voice signals. Although network 101 in the illustrative embodiment comprises a Voice-over-IP (VoIP) enterprise network, network 101 could alternatively or additionally comprise another type of network such as the Internet, some other type of IP-based network, or some other type of packet-based network (e.g., asynchronous transfer mode, multiprotocol label switching [MPLS], etc.), as those who are skilled in the art will appreciate. Furthermore, although network 101 is a business enterprise's telecommunications network in the illustrative embodiment, it will be clear to those skilled in the art how to make and use alternative embodiments in which network 101 is a different type of network.

Telecommunications endpoints 102-1 through 102-M are end-user telephony devices, such as speakerphones, desksets, cellular phones, soft phones resident in computers, personal digital assistants, and so forth. Each being equipped with a loudspeaker and/or microphone, endpoints 102-1 through 102-M enable their users to communicate at least audibly with one other, or with users of other endpoints supported by network 101 that are not depicted. Accordingly, endpoints 102-1 through 102-M interoperate with network 101 and with one other in well-known fashion.

In accordance with the illustrative embodiment, endpoint 102-$m$, wherein m has a value of 1 through M, is capable of taking voice-quality measurements (VQM) and of providing VQM statistics to a requesting node such as data-collection server 103. The set of statistics include, but are not limited to, one or more of the following:
  i. speech envelope,
  ii. background-noise envelope,
  iii. voice activity detection,
  iv. average speech level,
  v. average peak-speech level, and
  vi. average noise level.

As those who are skilled in the art will appreciate, endpoint 102-$m$ might be capable of providing other types of VQM statistics. The VQM statistics include statistics about the receive path, which represent the data packets arriving at endpoint 102-$m$ from enterprise network 101. The VQM statistics also include statistics about the transmit path, which represent the data packets that are first generated by endpoint 102-$m$ from the audio signals received from endpoint 102-$m$'s user (i.e., via the endpoint's microphone) and then transmitted into network 101. Each endpoint 102-$m$ can provide receive path statistics or transmit path statistics, or both.

Although endpoints 102-1 and 102-M are described above as providing VQM statistics, other nodes throughout system 101 are capable of providing similar statistics, as those who are skilled in the art will appreciate. For example, one or more of gateways 104-1 through 104-N, private-branch exchanges within network 101, and teleconference bridges within network 101 measure voice quality and provide VQM statistics to data-collection server 103.

In accordance with the illustrative embodiment, each endpoint 102-$m$ is a wired, Ethernet-based deskset. In some alternative embodiments, as those who are skilled in the art will appreciate, endpoints 102-1 through 102-M interface with network 101's infrastructure through any of a variety of link protocols (e.g., IEEE 802.11, CDMA, GSM, UMTS, etc.), wired or otherwise.

Data-collection server 103 is a data-processing system that accumulates the voice-quality measurement statistics collected by endpoints 102-1 through 102-M, as well as possibly other nodes. Server 103 performs the tasks of the illustrative embodiment that are described below and with respect to FIGS. 2 through 4. As those who are skilled in the art will appreciate, the techniques of the illustrative embodiment can be implemented at a data-processing system other than a server, in some alternative embodiments.

Gateway 104-*n*, for n=1 through N, is a data-processing system that comprises media gateway functionality that is known in the art, acting as a translator between two types of networks in well-known fashion. As depicted, gateway 104-*n* acts as a translator between Internet-Protocol-based network 101 and service provider network 105-*n*, which is described below. Gateway 104-*n* enables telecommunications over multiple transport protocols from one endpoint in one network to another endpoint in another network, in part by working in concert with one or more gateway controllers to set up, maintain, and terminate calls. For pedagogical purposes, the gateway controller functionality is incorporated into one or more of the depicted gateways.

Because gateway 104-*n* connects two different types of networks with each other, one of its main functions is to convert between the different transmission and coding techniques uses across the two different networks. In accordance with the illustrative embodiment, gateway 104-*n* is a Voice-over-Internet-Protocol-capable (VoIP-capable) media gateway that performs the conversion between i) time-division multiplexed (TDM) voice signals that originate at a telecommunications endpoint associated with network 105-*n* and ii) VoIP signals that are intended for an Internet Protocol network endpoint, such as one of endpoints 102-1 through 102-M. Gateway 104-*n* performs the conversion in the reverse direction as well (i.e., from an IP endpoint to a TDM endpoint) and is able to perform bidirectional conversion for multiple calls concurrently.

Service provider networks 105-1 through 105-N are portions of the Public Switched Telephone Network (PSTN), where each network 105-*n* is operated by a different service provider, such as Verizon and AT&T in the United States. The Public Switched Telephone Network, as is well-known in the art, comprises access paths, switches, and transmission paths, in a combination of analog and digital technology, which enable associated endpoints to communicate with other endpoints, including endpoints 102-1 through 102-M. In accordance with the illustrative embodiment, enterprise telecommunications network 101 is interconnected with at least two service provider networks (e.g., networks 105-1 and 105-2, etc.), via the corresponding gateways (e.g., gateways 104-1 and 104-2, etc.). Using multiple service providers to provide users with access to outside the enterprise network is a common practice followed by many larger business enterprises.

In accordance with the illustrative embodiment, each of service provider networks 105-1 through 105-N provides the same type of service to enterprise network 101 (e.g., voice telephony, etc.). In some alternative embodiments, the type of service provided by one service provider network might be different from that provided by another service provider network. Furthermore, each network 105-*n* might comprise a vastly different complement of wireline equipment, wireless equipment, or both wireline and wireless equipment, from one network to another.

Figure 2:
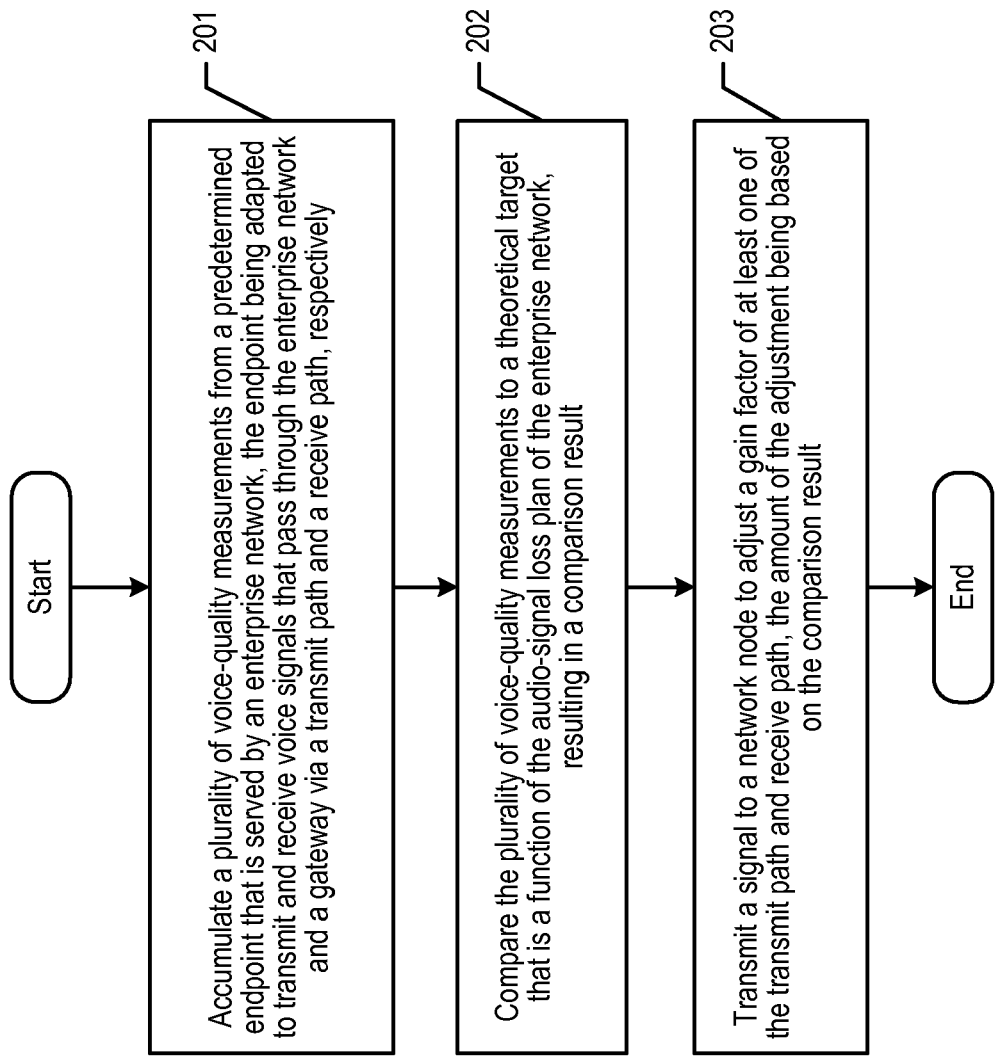
FIG. 2 depicts a flowchart of the salient tasks performed by data-collection server 103, as part of a first operating scenario.
Figure 3:
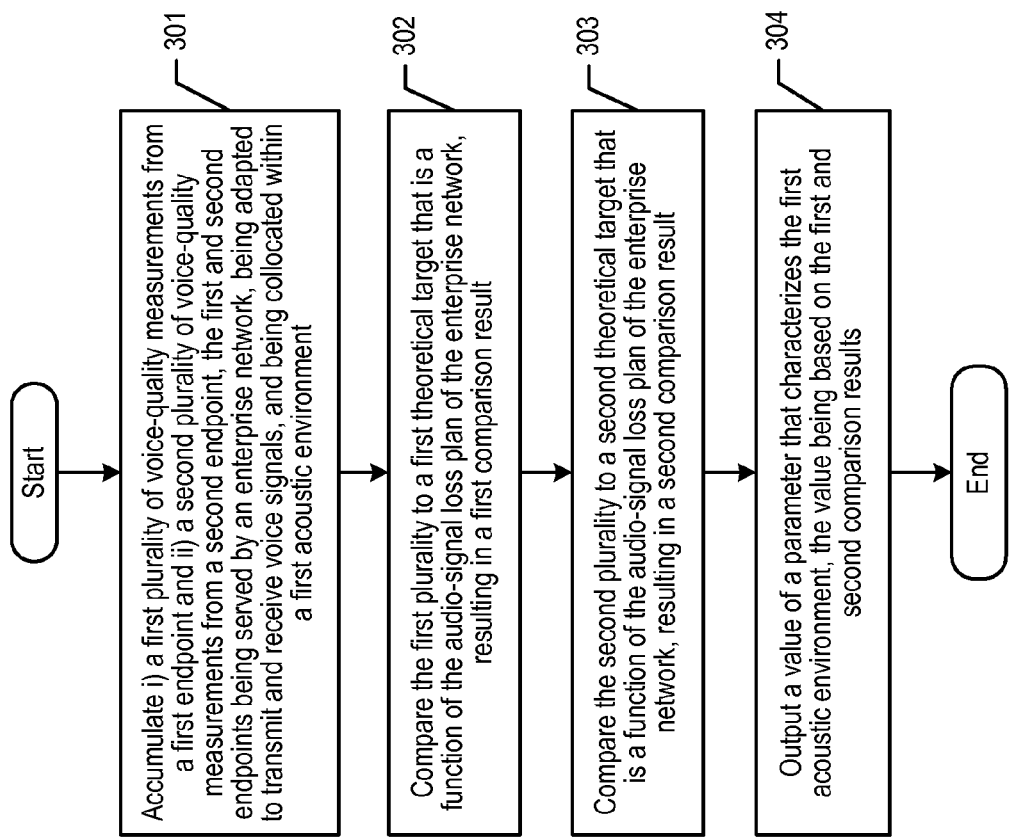
FIG. 3 depicts a flowchart of the salient tasks performed by data-collection server 103, as part of a second operating scenario.
Figure 4:
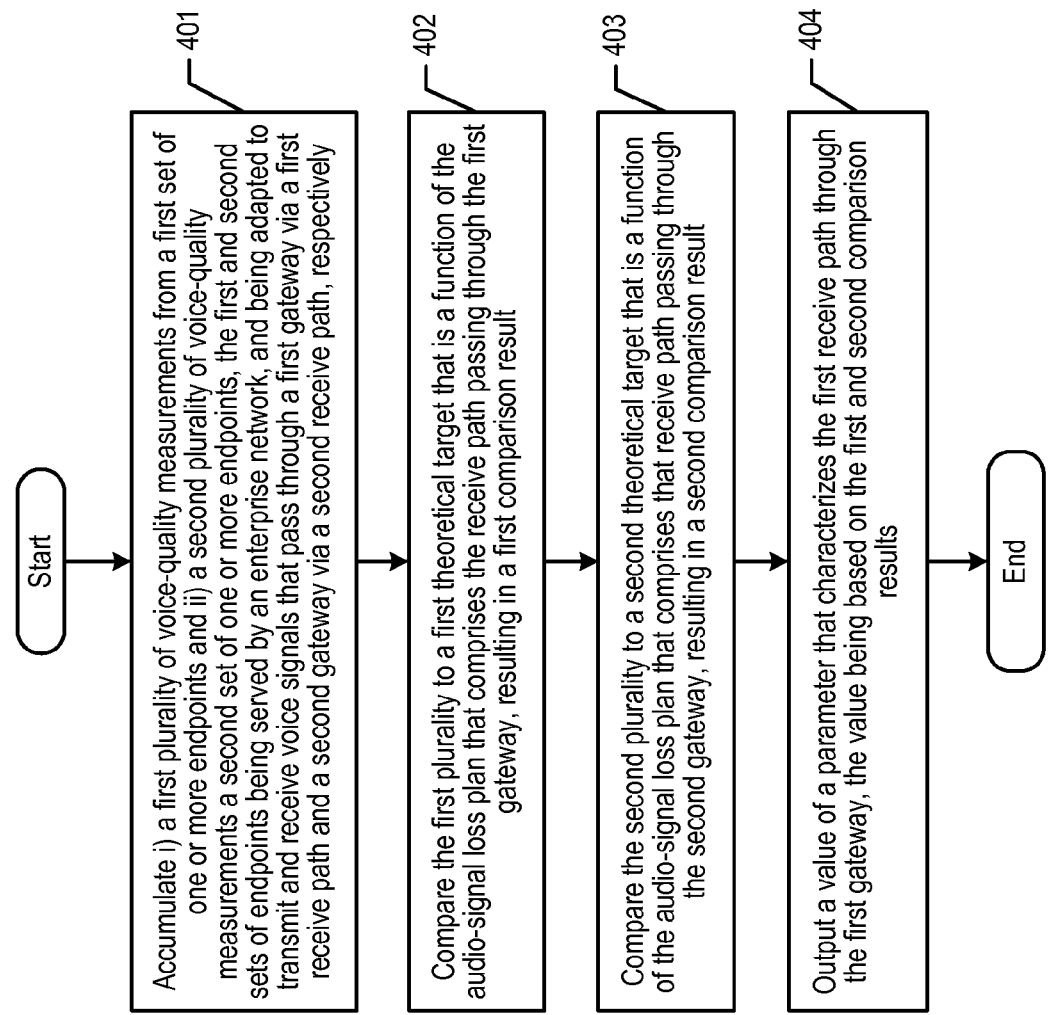
FIG. 4 depicts a flowchart of the salient tasks performed by data-collection server 103, as part of a third operating scenario.

FIGS. 2, 3, and 4 depict flowcharts of the salient tasks performed by data-collection server 103, as part of managing the audio-signal loss plans of enterprise network 101, and in accordance with the illustrative embodiment of the present invention. Each of the three figures relates to a different operating scenario that is related to the management of loss plans. As those who are skilled in the art will appreciate, some or all of the individual tasks depicted in FIGS. 2, 3, and 4 can be performed simultaneously or performed in a different order from that depicted.

In the first operating scenario, which is represented by FIG. 2, data-collection server 103 accumulates voice-quality measurements from a predetermined endpoint chosen among endpoints 102-1 through 102-M and uses those accumulated statistics to adjust a parameter related to the audio loss plan and at a selected gateway (i.e., one of gateways 104-1 through 104-N). As those who are skilled in the art will appreciate, the disclosed technique can be applied to accumulating and analyzing voice-quality measurements from more than one endpoint.

In the second operating scenario, which is represented by FIG. 3, data-collection server 103 accumulates a first plurality and second plurality of voice-quality measurements from a first endpoint and second endpoint, respectively, which endpoints are chosen among endpoints 102-1 through 102-M. The two endpoints are collocated within the same acoustic environment. For example, endpoints 102-1 and 102-2 can be spatially-adjacent endpoints at the same call center. In the second scenario, server 103 uses those accumulated statistics to output a parameter value that characterizes the acoustic environment that is common to both endpoints. Based on the statistics, server 103 can be used to analyze issues such as how to assign calls at a call center, whether to add acoustic suppression (e.g., ceiling tiles, etc.) to the acoustic environment, and so forth. As those who are skilled in the art will appreciate, the disclosed technique can be applied to accumulating and analyzing voice-quality measurements from more than two endpoints in the same acoustic environment.

In the third operating scenario, which is represented by FIG. 4, data-collection server 103 accumulates a first plurality and second plurality of voice-quality measurements from a first set of endpoints and second set of endpoints, respectively, the endpoints within each set being chosen from endpoints 102-1 through 102-M. The first set of endpoints is served by a first gateway, and the second set of endpoints is served by a second gateway, where the gateways are chosen from gateways 104-1 through 104-N. In some alternative embodiments, collection server 103 accumulates first and second pluralities of voice-quality measurements from the first and second gateways themselves, instead of from the first and second sets of endpoints served by those gateways. In the third scenario, server 103 uses those accumulated statistics to output a parameter value that characterizes a signal path associated with one of the gateways. Based on the statistics, server 103 can be used to analyze issues such why the audio signals being received from one service provider's network might be consistently at a different signal level than those being received from another service provider's network. As those who are skilled in the art will appreciate, the disclosed technique can be applied to accumulating and analyzing voice-quality measurements associated with more than two sets of endpoints or with more than two service provider networks, or both.

In each scenario, as those who are skilled in the art will appreciate, server 103 may obtain the voice-quality measurements in one or more of various different ways, such as transmitting a single request to a measuring node to start transmitting measurements, transmitting a one-for-one request for each measurement to be transmitted, or accepting whatever measurements are transmitted by a sending node. In other words, server 103 might pull information from one or more sending nodes, both receive pushed information from the sending nodes, or both.

FIG. 2, now to be described in detail, depicts a flowchart of the salient tasks performed by data-collection server 103, as part of the first operating scenario described above. At task 201, server 103 accumulates a plurality of voice-quality measurements from a predetermined endpoint that is served by enterprise network 101, in this case endpoint 102-1. Telecommunications endpoint 102-1 is capable of transmitting and receiving voice signals that pass through enterprise network 101 and a selected telecommunications media gateway, in this case gateway 104-2, via a transmit path and a receive path, respectively. As those who are skilled in the art will appreciate, in some alternative embodiments, server 103 instead accumulates a plurality of voice-quality measurements from a predetermined network node that is not an endpoint.

In some embodiments, server 103 is able to select not only the gateway to analyze and the endpoint or endpoints to use in the analysis, but also specific pathways through intermediate nodes within network 101 itself. For example, some of the voice-quality measurements that are selected for use can represent a path that passes through a private-branch exchange or a teleconference bridge in network 101. Server 103 might or might not be accumulating statistics from the intermediate nodes, depending in part on the measuring capability of each intermediate node selected.

At task 202, server 103 compares the plurality of accumulated voice-quality measurements to a theoretical target. The theoretical target is a function of the audio-signal loss plan of enterprise network 101. In some embodiments, the theoretical target is also a function of a signal model of the predetermined endpoint (i.e., endpoint 102-1). The comparing task that is performed at task 202 results in a comparison result.

The theoretical target is calculated in well-known fashion. For example, if the theoretical target is to be calculated with respect to average peak-speech level, the target would ideally be at a value at which the full digital representation of a speech signal is utilized in each virtual channel used by calls throughout enterprise network 101. In other words, the objective in setting the audio levels would be to maximize the signal-to-quantization-noise ratio in each communications link from one network node to the next. A goal for achieving such an objective might be to maintain a target speech root-mean-square (RMS) level at approximately −15 dBm relative to the maximum digitally representable signal level, so as to maximize use of the available digital signal representation without reaching the saturation, or overload, point. As another example, if the theoretical result is to be calculated with respect to noise, recognizing that lower levels of noise are better than higher levels, an objective along this line would be to maximize the ratio of average speech level to average noise level. A goal for achieving such an objective might be to maintain the speech-to-noise ratio at 40 dB or greater.

As those who are skilled in the art will appreciate, there might be other considerations that are needed to be made when calculating the theoretical target. Furthermore, the calculation of theoretical target will vary from one voice-quality measurement type (e.g., peak-speech level, noise, etc.) to another.

At task 203, server 103 transmits a signal to selected gateway 104-2 to adjust a gain factor of at least one of the transmit communication path and the receive communication path, the amount of the adjustment being based on the comparison result. In some alternative embodiments, the result is instead provided to a technician who can then make the appropriate adjustment to the gain factor, or the result is instead transmitted to a network node other than the gateway.

FIG. 3 depicts a flowchart of the salient tasks performed by data-collection server 103, as part of the second operating scenario described above. At task 301, server 103 accumulates i) a first plurality of voice-quality measurements from a first endpoint, in this case endpoint 102-1, and ii) a second plurality of voice-quality measurements from a second endpoint, in this case endpoint 102-2. Endpoints 102-1 and 102-2 are capable of transmitting and receiving voice signals. Furthermore, endpoints 102-1 and 102-2 are collocated within the same acoustic environment, such as being spatially-adjacent to each other at a call center. As those who are skilled in the art will appreciate, in some alternative embodiments, server 103 instead accumulates pluralities of voice-quality measurements from network nodes that are not endpoints.

In some embodiments, server 103 is able to select not only the particular acoustic environment to analyze and the endpoint or endpoints common to that environment to use in the analysis, but also specific pathways through intermediate nodes within network 101 itself. For example, some of the voice-quality measurements that are selected for use can represent a path that passes through a private-branch exchange or a teleconference bridge in network 101. Server 103 might or might not be accumulating statistics from the intermediate nodes, depending in part on the measuring capability of each intermediate node selected.

At task 302, server 103 compares the first plurality of voice-quality measurements to a first theoretical target. The first theoretical target is a function of the audio-signal loss plan of enterprise network 101. In some embodiments, the first theoretical target is also a function of a signal model of the first predetermined endpoint (i.e., endpoint 102-1). The calculation of the theoretical target is described above and with respect to task 202. The comparing task that is performed as part of task 302 results in a first comparison result.

At task 303, server 103 compares the second plurality of voice-quality measurements to a second theoretical target. The second theoretical target is a function of the audio-signal loss plan of enterprise network 101, where the function representing the second theoretical target might be the same as or might be different from the function represent the first theoretical target. In some embodiments, the second theoretical target is also a function of a signal model of the second predetermined endpoint (i.e., endpoint 102-2). The comparing that is performed as part of task 303 results in a second comparison result.

At task 304, server 103 outputs a value of a parameter that characterizes the first acoustic environment. In accordance with the illustrative embodiment, the value is based on the first and second comparison results. In some embodiments, server 103 can transmit the parameter to a node that is more closely associated with the acoustic environment being analyzed, such as a monitoring node at a call center that is used by the local technician.

FIG. 4 depicts a flowchart of the salient tasks performed by data-collection server 103, as part of the third operating scenario described above. At task 401, server 103 accumulates a first plurality of voice-quality measurements from a first set of one or more endpoints, in this case endpoints 102-1 through 102-10. Server 103 also accumulates a second plurality of voice-quality measurements from a second set of one or more endpoints, in this case endpoints 102-11 through 102-20. Endpoints 102-1 through 102-10 are capable of at least receiving voice signals that pass through a first telecommunications gateway, in this case gateway 104-7, via a first receive path. Furthermore, endpoints 102-11 through 102-20 are capable of at least receiving voice signals that pass through a second telecommunications gateway, in this case gateway 104-8, via a second receive path. In the example, gateway 104-7 provides access to the Verizon network, and gateway 104-8 provides access to the AT&T network. As those who can appreciate, the gateways that are selected for the analysis alternatively can be those which provide access to the same service provider's network.

In accordance with the illustrative embodiment, server 103 accumulates voice-quality measurements from sets of endpoints. As those who are skilled in the art will appreciate, in some alternative embodiments, server 103 can instead accumulate pluralities of voice-quality measurements from network nodes that are not endpoints, such as the first and second telecommunications gateways.

In the example provided, the first set and second set of endpoints are mutually exclusive. As those who are skilled in the art will appreciate, however, the first and second sets of endpoints can comprise at least one endpoint that is common to both sets, or can even have the same exact endpoints in both sets.

In some embodiments, server 103 is able to select not only the gateways to analyze and the endpoints to use in the analysis, but also specific pathways through intermediate nodes within network 101 itself. For example, some of the voice-quality measurements that are selected for use can represent a path that passes through a private-branch exchange or a teleconference bridge in network 101. Server 103 might or might not be accumulating statistics from the intermediate nodes, depending in part on the measuring capability of each intermediate node selected.

At task 402, server 103 compares the first plurality of voice-quality measurements to a first theoretical target. The first theoretical target is a function of the audio-signal loss plan of enterprise network 101. In some embodiments, the first theoretical target is also a function of a signal model of one or more of the endpoints in the first set (i.e., endpoints 102-1 through 102-10). The calculation of the theoretical target is described above and with respect to task 202. The comparing task that is performed as part of task 402 results in a first comparison result.

At task 403, server 103 compares the second plurality of voice-quality measurements to a second theoretical target. The second theoretical target is a function of the audio-signal loss plan of enterprise network 101, where the function representing the second theoretical target might be the same as or might be different from the function represent the first theoretical target. In some embodiments, the second theoretical target is also a function of a signal model of one or more of the endpoints in the second set (i.e., endpoint 102-11 through 102-20). The comparing that is performed as part of task 403 results in a second comparison result.

At task 404, server 103 outputs a value of a parameter that characterizes the first receive path (i.e., through gateway 104-7). In accordance with the illustrative embodiment, the value is based on at least one of the first and second comparison results. In some embodiments, server 103 also outputs a value of a parameter that characterizes the second receive path (i.e., through gateway 104-8). In accordance with the illustrative embodiment, this value is also based on at least one of the first and second comparison results.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method of managing an audio-signal loss plan of an enterprise network in a telecommunications system, wherein the enterprise network serves a plurality of telecommunications endpoints that are connected to the enterprise network, the method comprising:

accumulating, at a data-processing system, a plurality of voice-quality measurements from a predetermined telecommunications endpoint that is served by the enterprise network, the telecommunications endpoint being adapted to transmit and receive voice signals that pass through the enterprise network and a telecommunications gateway via a transmit path and a receive path, respectively, and wherein the plurality of voice-quality measurements comprises statistics related to at least one of voice activity detection and average noise level;

comparing, by the data-processing system, the plurality of voice-quality measurements to a theoretical target that is a function of the audio-signal loss plan of the enterprise network, resulting in a comparison result; and transmitting a signal from the data-processing system to the telecommunications gateway to adjust a gain factor of at least one of the transmit path and the receive path, an amount of the adjustment being based on the comparison result.

2. The method of claim 1, wherein the theoretical target comprises a function of a signal model of the predetermined endpoint.

3. The method of claim 1 wherein the statistics are based on signal measurements performed by the predetermined endpoint in the transmit path.

4. The method of claim 1 wherein the statistics are based on signal measurements performed by the predetermined endpoint in the receive path.

5. The method of claim 4, wherein at least some of the signal measurements are for voice signals that pass through a private-branch exchange in the enterprise network.

6. The method of claim 4, wherein at least some of the signal measurements are for voice signals that pass through a teleconference bridge in the enterprise network.

7. A method of managing an audio-signal loss plan of an enterprise network in a telecommunications system, wherein the enterprise network serves a plurality of telecommunications endpoints that are connected to the enterprise network, the method comprising:

accumulating, at a data-processing system in the telecommunications system, i) a first plurality of voice-quality measurements from a first telecommunications endpoint that is served by the enterprise network and ii) a second plurality of voice-quality measurements from a second telecommunications endpoint that is served by the enterprise network, the first telecommunications endpoint and the second telecommunications endpoint being adapted to transmit and receive voice signals and being spatially collocated within an acoustic environment for capturing the voice signals, and wherein the first plurality of voice-quality measurements comprises statistics related to at least one of voice activity detection and average noise level;

comparing i) the first plurality of voice-quality measurements to a first theoretical target that is a function of the audio-signal loss plan of the enterprise network, resulting in a first comparison result, and ii) the second plurality of voice-quality measurements to a second theoretical target that is a function of the audio-signal loss plan of the enterprise network, resulting in a second comparison result; and outputting, by the data-processing system, a value of a parameter that characterizes the acoustic environment, the value being based on the first comparison result and the second comparison result.

8. The method of claim 7, wherein the first theoretical target comprises a function of a signal model of the first telecommunications endpoint, and wherein the second theoretical target comprises a function of a signal model of the second telecommunications endpoint.

9. The method of claim 7 wherein the statistics are based on signal measurements performed by the first telecommunications endpoint in the transmit path.

10. The method of claim 7 wherein the statistics are based on signal measurements performed by the first telecommunications endpoint in the receive path.

11. The method of claim 10, wherein at least some of the signal measurements are for voice signals that pass through a private-branch exchange in the enterprise network.

12. A method of managing an audio-signal loss plan of an enterprise network in a telecommunications system, wherein the enterprise network serves a plurality of telecommunications endpoints that are connected to the enterprise network, the method comprising:

accumulating, at a data-processing system in the telecommunication system, i) a first plurality of voice-quality measurements from a first set of one or more telecommunications endpoints that are served by the enterprise network, and ii) a second plurality of voice-quality measurements from a second set of one or more telecommunications endpoints that are served by the enterprise network, the first set and the second set being adapted to receive voice signals that pass through a first telecommunications gateway via a first receive path and a second telecommunications gateway via a second receive path, respectively, wherein the first plurality of voice-quality measurements comprises statistics related to at least one of voice activity detection and average noise level;

comparing i) the first plurality of voice-quality measurements to a first theoretical target that is a function of the audio-signal loss plan that comprises the receive path passing through the first telecommunications gateway, resulting in a first comparison result, and ii) the second plurality of voice-quality measurements to a second theoretical target that is a function of the audio-signal loss plan that comprises the receive path passing through the second telecommunications gateway, resulting in a second comparison result; and outputting, by the data-processing system, a value of a parameter that characterizes the first receive path through the first telecommunications gateway, the value being based on the first comparison result and the second comparison result.

13. The method of claim 12, wherein the first theoretical target is also a function of a signal model of one or more endpoints in the first set, and wherein the second theoretical target is also a function of a signal model of one or more endpoints in the second set.

14. The method of claim 12, wherein the first set and the second set are mutually exclusive with respect to each other.

15. The method of claim 12, wherein the first set and the second set comprise at least one endpoint that is common to both sets.

16. The method of claim 12, further comprising outputting by the data-processing system a second value of a parameter that characterizes the second receive path through the second telecommunications gateway, the second value being based on the first comparison result and the second comparison result.

* * * * *